United States Patent [19]

Mukerji

[11] Patent Number: 4,654,845
[45] Date of Patent: Mar. 31, 1987

[54] PARALLEL CALL PROCESSING SYSTEM AND METHOD

[75] Inventor: Jishnu Mukerji, Ocean Township, Monmouth County, N.J.

[73] Assignees: AT&T, New York, N.Y.; AT&T Information Systems Inc., Holmdel, N.J.

[21] Appl. No.: 713,245

[22] Filed: Mar. 18, 1985

[51] Int. Cl.<sup>4</sup> ........................ H04Q 11/04; H04M 3/00
[52] U.S. Cl. .......................................... 370/58; 370/67; 379/284; 379/309
[58] Field of Search ........................ 370/62, 67, 85, 58; 179/18 BC, 18 ES

[56] References Cited

U.S. PATENT DOCUMENTS

| | | | |
|---|---|---|---|
| 4,296,403 | 10/1981 | Haensel | 179/18 ES |
| 4,317,962 | 3/1982 | Cox et al. | 179/18 ES |
| 4,389,720 | 6/1983 | Baxter et al. | 370/62 |
| 4,412,282 | 10/1983 | Holden | 179/18 ES |
| 4,488,004 | 12/1984 | Bogart et al. | 179/18 ES |
| 4,497,979 | 2/1985 | Phelan | 370/62 |
| 4,528,658 | 7/1985 | Israel | 370/58 |
| 4,530,051 | 7/1985 | Johnson et al. | 179/18 ES |

Primary Examiner—Douglas W. Olms
Assistant Examiner—Curtis Kuntz
Attorney, Agent, or Firm—D. H. Tannenbaum

[57] ABSTRACT

An arrangement for achieving multi-processing is disclosed for use in a communication system where it is desired to have several independent processors operating in parallel on stimuli received from the connected terminals. Each such terminal is associated with a particular processor and that processor serves to control connections involving its associated stations. Stimuli from the station are stored in a queue and processed in an intermixed fashion such that stimuli from the connection are processed in order of arrival of the stimulus, but stimuli from different connections are processed without regard to the relative order of arrival of stimuli between connections.

38 Claims, 13 Drawing Figures

FIG. 3
IN TRADITIONAL PBX (FIG. 1) THE ORDER OF PROCESSING OF STIMULII IS THE ORDER IN WHICH THE STIMULI ARRIVE:

FIG. 4
AS SHOWN IN FIG. 2, STIMULI CAN BE PROCESSED OUT OF ORDER OF ARRIVE PROVIDING STIMULII PERTAINING TO THE SAME CALL ARE PROCESSED IN THE ORDER IN WHICH STIMULI FOR THAT CALL ARRIVE.

FIG. 5
THE FOLLOWING IS AN IMPROPER SEQUENCE

— CONTROL CHANNEL
---- VOICE/DATA CONNECTION
— INTER-CE COMMUNICATION

FIG. 11 PROCESSING INCOMING STIMULUS

FIG. 12 PROCESSING OUTGOING STIMULUS

PARALLEL CALL PROCESSING SYSTEM AND METHOD

BACKGROUND OF THE INVENTION

This invention relates to communication systems and more particularly to such systems having multiprocessing capability.

It is desirable for a communication system, such as a Private Branch Exchange (PBX), to grow in size in small increments as the needs of the PBX user increases. Traditionally, PBX's are designed to be optimally economic around a particular size and when the size is surpassed a PBX having a greater processing capacity is usually required.

Some PBX users, when faced with a PBX having limited processing capacity, try to solve the problem by connecting two or more PBX's together. This solution is usually unsatisfactory since the user then perceives a difference of features depending upon which PBX is invoked.

Other problems arise when a user attempts to connect PBX's together in parallel, thereby allowing either PBX to serve any user.

These problems arise because traditional PBX control elements are programmed to process any received stimulus (such as an off-hook signal) to completion before the next stimulus is processed. This serial processing of stimuli ensures that the processing of stimuli keeps in step with the arrival of stimuli. Thus, the control element can be viewed as a batch processor of stimuli that arrive from equipments that are connected to the PBX switch.

A dual PBX arrangement is essentially a second switch and a second control element (module) connected together switch to switch and control element to control element to form switch and control element pairs or a pair of modules. The additional processing power comes from the fact that there are two control elements which now can process stimuli in parallel. This, however, is where the fundamental problem lies.

When two control elements process stimuli in parallel, the general rules of processing stimuli in the order of their arrival, and of processing stimuli to completion results in excess waiting time, and hence, reduced apparent processing capability, since the stimuli for one call must be completely processed before stimuli for a second call can be processed. This is so since both processors interact to complete the called connection, and this one processor spends time waiting for the other processor to complete a processing task with respect to the stimulus which is being processed to completion.

SOLUTION TO THE PROBLEM

The solution to the problem hinges on recognizing the fact that for the proper operation of a PBX it is not necessary that all stimuli be processed sequentially and to completion. It is sufficient to adhere to the principle of sequential processing to completion for only a collection of interrelated stimuli. Once such collections of stimuli have been identified, it is sufficient to ensure that stimuli belonging to a collection be processed to completion in the order in which they arrive. Stimuli belonging to different collections, then, may be processed safely out of sequence, and even in parallel in the two or more control elements. Moreover, each such collection interrelated stimuli can then be assigned to a single control element, thus obtaining parallelism of processing among such collections of stimuli.

Some terminology must be established for enumerating the rules for identifying the stimuli which form a collection.

A "simple call" is a call which connects two or more terminals together in a conversation. The simple call does not interact with any equipment other than the terminals and the switch resources that are used to keep the call active. The only stimuli associated with a simple call are those that are generated by the terminals that are connected together in that call. Therefore, in order to ensure that the processing of stimuli associated with a simple call is done correctly, it is sufficient to ensure that those stimuli associated with the terminals active in that call are processed sequentially to completion.

The stimuli associated with a typical simple call are the following:
1. A terminal goes off hook;
2. The first digit is dialed;
3. Subsequent digits are dialed;
4. The called party's terminal rings;
5. The called party answers by going off hook;
6. One of the two terminals goes on hook (hangs up);
7. The other terminal goes on hook.

It is worth observing here that if a second simple call were being processed at the same time as this one, none of the stimuli listed above would effect the second call in any way, and vice versa, i.e., none of the stimuli belonging to the second call would affect this call. Thus, since stimuli belonging to one simple call have no effect on other simple calls, stimuli belonging to two calls may be processed out of sequence and in parallel, without affecting the proper operation of the PBX. Consequently, a control element which ensures that stimuli belonging to the same simple call are grouped together and processed sequentially to completion, will work perfectly well in an arrangement where two or more such control elements are processing stimuli belonging to different calls in parallel.

Moreover, the same control element could temporarily suspend processing a stimulus belonging to one call and process stimuli belonging to a different call, returning at some time to complete processing the stimuli of the first call. The importance of this observation will become apparent in the detailed description of the invention.

If all connections handled by a PBX were simple, then the rule enumerated above would be sufficient to ensure proper operation of a multi-module PBX. Unfortunately, all calls in a PBX are not simple. There are situations where two simple calls merge, such as for conferencing, at a single point of time. The conferencing scenario consists of setting up one simple call, then setting up a second simple call, and then merging the two calls together, to obtain a new simple call having three terminals.

I have found that it is possible to merge calls if they are both in a quiescent state before they are merged. The quiesent state in this situation means that there are no outstanding unprocessed stimulus associated with the call. A call can be brought to a quiescent state by processing sequentially to completion all stimuli that were received before the merger attempt. If the quiescent state condition is observed when merging two simple calls, the same principle of parallel processing of stimuli as described above can be followed without adversely affecting the operation of a PBX having multi-processing modules.

BRIEF DESCRIPTION OF THE DRAWING

These and other objects and features, together with the operation and utilization of the present invention, will be more apparent from the illustrative embodiment shown in conjunction with the drawing in which.

DETAILED DESCRIPTION

Figure 1:
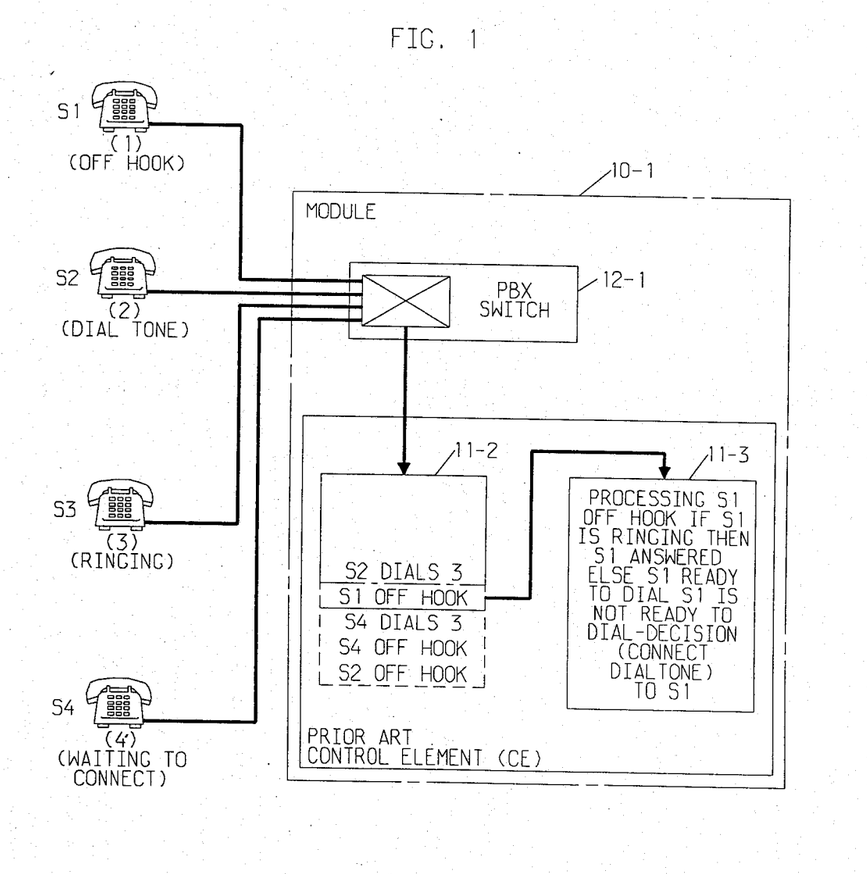
FIG. 1 shows a single processing PBX system as used in the prior art.

A typical prior art operation of the control module is illustrated. Each telephone instrument sends stimuli to switch 12-1, which directs the stimuli to control element 11-1. These stimuli are generated when specific events, such as the terminal going off-hook or a number being dialed, occurs. All such stimuli are queued in a holding area 11-2 with the control element in the order in which they arrive. The stimuli are then processed one at a time to completion in the order of arrival.

In FIG. 1, the stimuli that have been received at control element 11-1 are shown in stack 11-2. Each stimulus is of the form, station, action, parameter where station identifies the station that originated the stimulus, action identifies the type of the stimulus, and parameter is an optional value associated with the stimulus. The stimulus that is shaded in stack 11-2 is the one that is currently being processed by processor 11-3. The stimuli shown below the shaded stimuli have already been processed and are shown only for the sake of clarity.

The situation depicted in FIG. 1 is that station S2 has gone off-hook and obtained dialtone. Subsequently, station S4 has gone off hook and obtained dialtone, following which it has dialed the digit 3. As a result of the processing of the dialed 3 stimulus, station S3 is ringing, but has not been picked up yet.

At this point station S1 goes off-hook and that stimulus is currently being processed. A summary of the decision procedure involved in determining what to do about the stimulus from station S1 is illustrated in processor box 11-3. As a result of this processing, station S1 will be connected to dialtone.

While the stimulus from station S1 is being processed, one more stimulus has arrived and is awaiting processing in the queue. This stimulus is from station S2 which has dialed the digit 3. This stimulis will be processed next, after the processing of the current stimulus is completed. The result of that processing will be that station S2 will receive a busy tone since station S3 is ringing on a call from station S4, and is thus busy.

Figure 2:
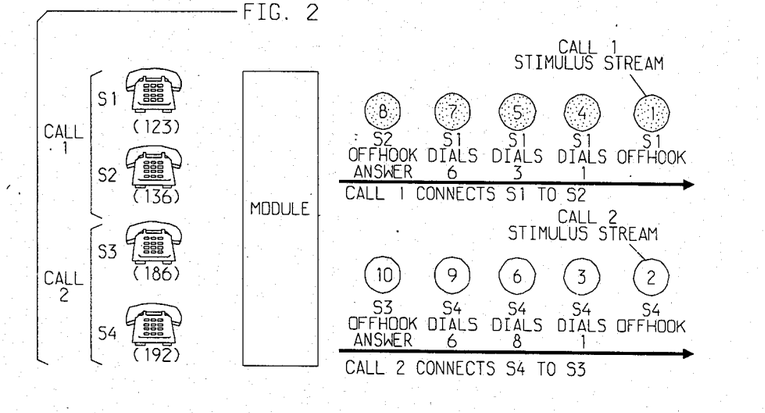
FIG. 2 illustrates typical call sequences.

FIG. 2 illustrates the importance of the order in which stimuli are processed and the cases where stimuli may be processed out of order. The identification of the rules illustrated in this figure form the basis of my invention and their importance will be illustrated in FIG. 4.

FIG. 2 shows two call setups, call 1 connecting station S1 to station S2, and call 2 connecting station S4 to station S3. Call 1 was originated by station S1 and call 2 was originated by station S4. The two rows to the right of module 10-1 show the order in which stimuli associated with the calls were generated. Each row corresponds to stimuli associated with a single call. The top row is for call 1, and the bottom row for call 2. As depicted, the order of occurrence of the stimuli within each call is obtained by reading the stimuli in the stimulus stream for that call from right to the left.

The numbers in the circles show the ordering in real time of the arrival of the stimuli. For example, the stimulus numbered 1 (station S1 off hook) arrived before the station numbered 2 (station S4 off hook). The number shown in ( ) below each station is the PBX number identity of that station.

Figure 3:
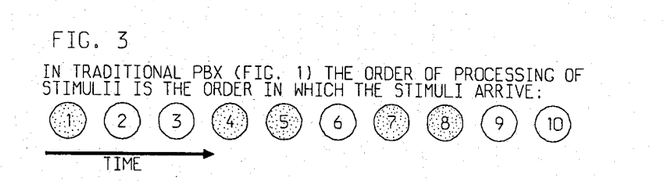
FIG. 3 shows a traditional stimuli processing sequence.

FIG. 3 shows the order in which these stimuli would be processed in a traditional PBX, which is exactly in the order in which they arrived. Moreover, each stimulus will be processed to completion before the processing of the next stimulus is begun. This makes it difficult to take advantage of parallel processing capabilities. Since, as discussed above, call 1 and call 2 do not interact with each other at any point, it is possible to process the stimulus numbered 2 before the stimuli numbered 4 and 5 are processed without affecting the proper operation of the PBX. The basic rule that one has to abide by is that stimuli associated with a single call must be processed to completion in the order in which they arrive.

Figure 4:
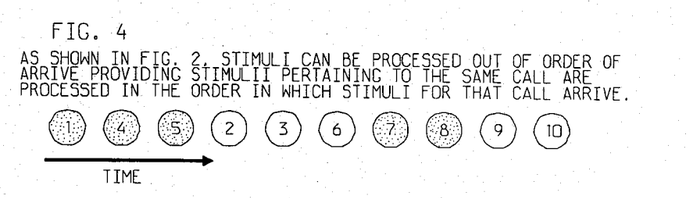
FIG. 4 shows one example of an intermixed stimuli processing sequence.

FIG. 4 depicts one sequence of processing of the stimuli shown in FIG. 2 obeying the rule stated above. Thus, a permissible stimuli ordering is one in which the numbers of the shaded stimuli (one grouping) are in increasing order among the shaded stimuli, and the numbers of the non-shaded stimuli (second grouping) are in increasing order among the non-shaded stimuli.

Figure 5:
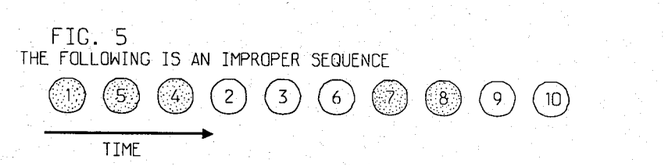
FIG. 5 shows an example of an improper stimuli processing sequence.

FIG. 5 illustrates an improper stimuli sequence. The sequence of processing the shaded stimuli in FIG. 5 is not in an increasing order, and is therefore not admissible.

Figure 6:
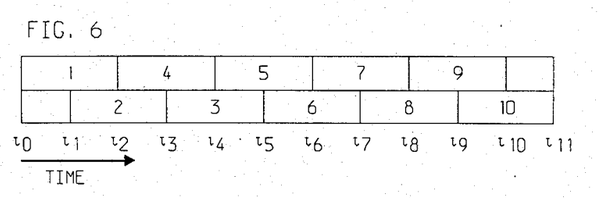
FIG. 6 is a timing diagram showing an example of the parallel processing of intermixed stimuli sequences.

Moreover, as long as the stimuli associated with each call (group) are maintained in separate streams, they may be processed in an overlapped fashion as shown in FIG. 6. Thus, processing of stimulus 1 may begin at time t0 and continued until time t2. Meanwhile, processing of stimulus 2, which is an unshaded stimulus, may begin at time t1 less that time t2 and continue until time t3 greater than time t2. Note that the processing times for each set of stimuli may be different and may overlap. These properties make it possible to take full advantage of multiple processors processing a number of stimuli in parallel.

Figure 7:
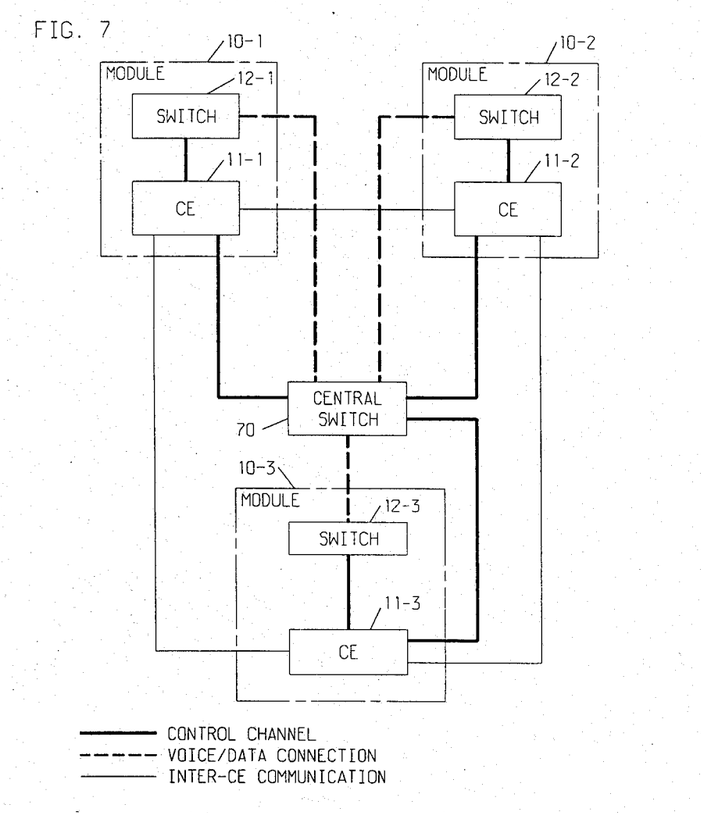
FIG. 7 is an example of a system having multiple PBX modules linked together via a central switch.

FIG. 7 shows one manner of interconnecting a number of basic PBX modules to obtain a large PBX from smaller PBX's.

The switches in each module are connected together via a central switch using voice-data channels. Central switch 70 has a rudimentary control mechanism, which is capable of connecting a number of ports to a single call. Switch 70 can be any circuit switch capable of establishing multi-port conference connections, such as for example, the switch shown in the Baxter et al, U.S. Pat. No. 4,389,720, dated June 21, 1983, which patent is hereby incorporated by reference herein. The allocation of interswitch voice-data channels to a call, and the setting up of the connections in the central switch are negotiated between the CEs of the modules involved in the call. The command to set up the connection through the central switch is originated by the CE that controls the call. When a call is terminated, the deallocation of inter-switch channels is carried out by the CEs involved in the call. As will become more fully apparent, each simple call is processed by a single controlling CE without regard to which CE actually receives the stimuli associated with that simple call.

The voice-data channels that connect switch 12-1 to central switch 70 are controlled by CE 11-1.

Figure 8:
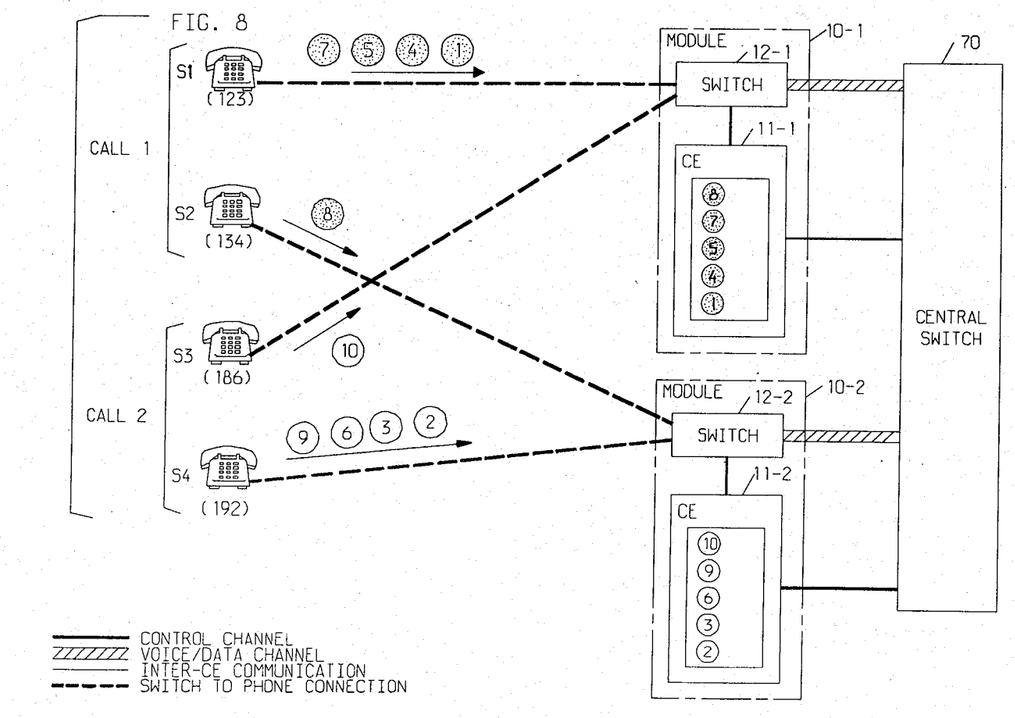
FIGS. 8, 9 and 10 show call processing in a multi-module parallel processing system.

FIG. 8 illustrates the details of the setup of a call in a two module situation. The call setup that was shown in FIG. 2 in a single module situation is now shown in a multi-module situation. Stations S1 and S3 are connected to module 10-1, and stations S2 and S4 are connected to module 10-2. As before, station S1 originates a call to station S3 and station S4 originates a call to station S2. The stimuli that are generated by each station as a result remain the same, and the time ordering of the stimuli are assumed to be the same as shown in FIG. 2. Thus, the stimulus sequence associated with call 1, as before is 1, 4, 5, 7, 8, shown in shaded circles, and those associated with call 2 are 2, 3, 6, 9, 10, shown in non-shaded circles.

Since call 1 was originated by station S1, the call is controlled by module 10-1 to which station S1 is connected. All stimuli associated with this call are forwarded to module 10-1. Thus, stimulus 8 from station S2, which is received by module 10-2, is forwarded to module 10-1 for processing. Similarly, stimulus 10 from station S3 is forwarded by module 10-1 to module 10-2 for processing.

Note that possible race condition between stimuli can occur if station S4 were to drop the call before stimulus 10 (an off hook by station S3 in response to ringing) were received in module 10-2. In such a situation, call 2 would be dropped by module 10-2 before stimulus 10 arrives in module 10-2. When stimulus 10 finally does arrive CE 11-2 will discover that the call with which stimulus 10 is associated does not exist. CE 11-2 will then return the stimulus to CE 11-1, which will require CE 11-1 to re-interpret the stimulus. CE 11-1 then re-interprets stimulus 10 (station S3 off hook) as an attempt to originate a call. Consequently, dialtone will be given to station S3, which is exactly what would happens in a single module PBX if a calling station, such as station S4, drops a call before the called station answers.

The processing steps of FIG. 8 can be summarized as follows:

1. Stimuli are received from stations and processed by the control element.
2. Processing a stimulus causes the control element to change the state of stations and the state of the call with which stimulus is associated, and sometimes to send stimuli back to the stations, thus, processing an incoming stimulus generates a number of outgoing stimuli.
3. The state of a station is maintained in the module to which it is attached. The state changes only as a result of an outgoing stimulus.
4. The state of a call is maintained by the CE that controls the call. This state changes as a result of processing stimuli and no outgoing stimuli is associated with it.
5. A module changing the state of a station not served by that module sends an outgoing stimulus to that effect to the module which controls the station.
6. Each control element has a high priority gueue for processing outgoing stimuli. This queue is distinct from the one servicing incoming stimuli. Incoming stimuli are not processed until all pending outgoing stimuli are processed to completion in a control element.
7. Processing of outgoing stimuli do not pre-empt the processing of an incoming stimulus that is already in progress.

Figure 9:
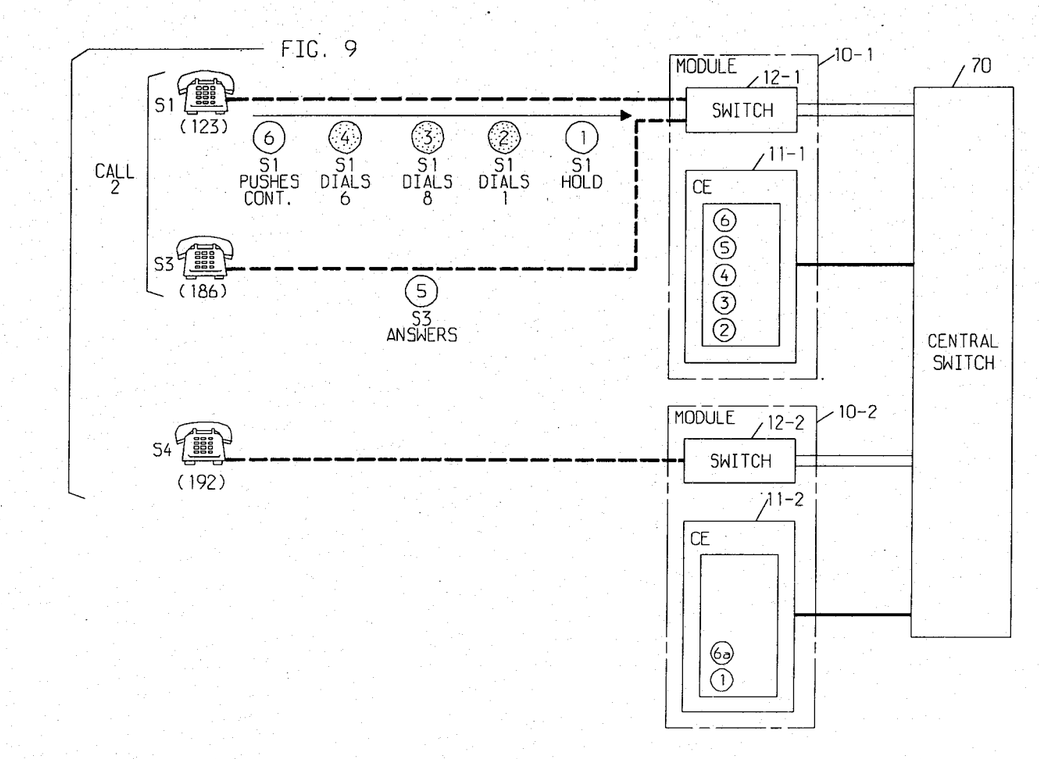

FIG. 9, illustrates how two simple calls are brought to a quiescent state before they are merged into a single call.

In this figure, stations S1 and S3 are connected to module 10-1 and station S4 is connected to module 10-2. Station S4 has originated a call to station S1 which has already been answered by station S1. This call is named call 1 in the figure. Since call 1 was originated by station S4 it is controlled by CE 11-2. At this point station S1 puts call 1 on hold, sets up call 2 by dialing station S2, (digits 186) and then after station S2 answers, enables signal (stimulus 6) to conference call 1 and call 2 together to form a single call.

FIG. 9 shows the stimuli that are generated by station S1. Stimulus 1 is "S1 signals for hold". Since stimulus 1 pertains to call 1 which is controlled by CE 11-2, CE 11-1 forwards stimulus 1 to CE 11-2 for processing. CE 11-2 interprets stimulus 1, puts call 1 on hold and notifies CE 11-1 that call 1 has been put on hold. CE 11-1 at this point finds station S1 off hook and provides station S1 with dialtone.

Station S1 then dials the digits 186, which are received by CE 11-1 as stimuli 2, 3 and 4. CE 11-1 interprets these stimuli and starts ringing station S3. Station 3 answers by going off hook, thus generating stimulus 5. As a result of processing this stimulus, CE 11-1 sets up call 2 between stations S1 and S2. Since station S1 originated this call, it is controlled by CE 11-1.

Now we have a situation where call 1 between stations S1 and S3, (which is on conference-hold) is controlled by CE 11-2, while call 2, which is controlled by CE11-1, is active. At this point, station S1 has its conference button pushed, thus generating stimulus 6 (S1 pushes conference). CE 11-1, upon receiving stimulus 6, finds the other call that is associated with station S11 and determines that that call (call 1) is controlled by CE 11-2. At this point CE 11-1 requests CE 11-2 to transfer control of call 1 to it. This it accomplished by sending the request in the form of stimulus 6a. Since, call 1 is in the appropriate quiescent state (hold) CE 11-2 can comply with the transfer request, thereby transfering control of the call to CE 11-1.

At the completion of processing of stimulus 6a, CE 11-1 controls both call 1 and call 2. Call 1 is quiescent and so is call 2, so CE 11-1 initiates a merge which involves rearranging the connections in the three switches involved in the call. In effect all the connections associated with call 1 and call 2 are released and a new set of connections needed for a three party call among stations S1, S3 and S4 are established.

As before, there are possibilities of race conditions occurring in this situation. For example, after call 1 is put on hold and before call 2 is completed, station S4 could drop call 1. Since CE 11-2 controls call 1 it will receive the drop stimulus before it receives the control transfer stimulus 6a from CE 11-1. CE 11-2 will drop call 1. When stimulus 6a arrives CE 11-2 will notify CE 11-1 of its inability to transfer control. CE 11-1 will then give denial tone to station S1 leaving stations S1 and S3 in call 2 and call 1 would no longer exist.

I have alluded to the fact that each CE requests certain action of the stations to which it is connected. These actions are requested in the most general form by sending "outward-stimuli" requesting the action to the stations, such as, for example, "ring station" . Interpretation of outward-stimuli either happens in the station, if the station is an intelligent station or happens in the module for other stations. For example, the outward-stimulus "ring station S2" is interpreted by CE 11-2 and ring-current is sent to station S2, if that station is incapable of responding to high level stimuli.

A module requests action from other modules in a similar way, by sending outward-stimuli. We have seen an example of such a stimulus in the form of stimulus 6a in FIG. 9.

Outward-stimuli are given special treatment by the receiving CE. Each CE maintains a separate queue of received outward-stimuli and these outward-stimuli are processed at a higher priority than the normal stimuli. The rules that are followed for doing so are the following:

1. Outward-stimuli are processed one at a time to completion by each CE.
2. No normal stimulus is processed in a CE until all pending outward-stimuli in that CE are processed to completion in that CE.
3. Processing of outward-stimuli may generate other outward-stimuli, but in no case will the processing of an outward stimulus be held up waiting for a response to an outward stimulus from another CE. In those cases where such a situation arises, the call will be placed in an appropriate different state pending the completion of processing of the outward-stimulus in question by the other CE. The other CE, upon completion of processing of the outward-stimulus, will send a outward-stimulus to the first CE notifying it of completion.
4. Processing of outward-stimuli never pre-empts the processing of a normal stimulus that is already in progress. Processing of outward-stimuli can begin only if either the processing of normal stimulus that was already being processed cannot proceed any further, because it is waiting for a response from another CE, or its processing is completed.

Figure 10:
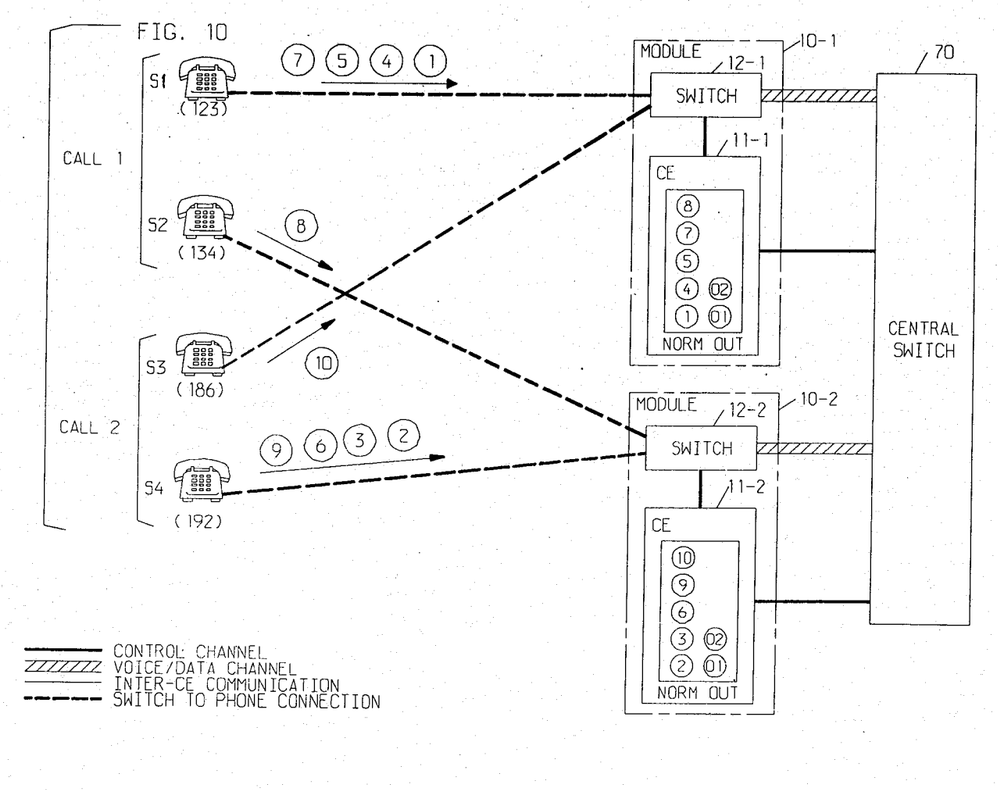

FIG. 10 illustrates the notion of outward-stimuli and their processing. The same call setup scenario as in FIG. 8 is repeated, together with the separate high priority queue for outward-stimuli marked OUT in each CE. The normal stimulus queue is marked NORM. As before stimuli associated with call 1 are in shaded circles whereas stimuli for call 2 are in non-shaded circles. The outward-stimuli are numbered 01, 02 etc.

In this figure, stimulus 7 from station S1 completes the dialing of station S2. In processing that stimulus CE 11-1 decides that the call must be completed with the cooperation of CE 11-2 since CE 11-2 controls station S2. Thus, CE 11-1 sends an outward-stimulus 01 to CE 11-2. Outward stimulus 01 asks CE 11-2 to reserve an inter-switch channel for this call and to "ring" station S2. When station S2 answers the call, CE 11-2 notifies CE 11-1 of that fact by forwarding the off-hook stimulus to CE 11-1 (stimulus 8). CE 11-1 in processing stimulus 8 sends outward-stimulus 02 to CE 11-2 asking it to complete the connection. An exactly analogous sequence of outwardstimuli follow for call 2 with the roles of CE 11-1 and CE 11-2 reversed.

An important point is that the processing of a normal stimulus may be suspended pending the completion of processing of an outward-stimulus in another CE. But the processing of an outward-stimulus should never be suspended. Each CE manages a number of separate streams of normal stimuli, each stream associated with a call that is in progress. Each such stream is processed in the CE by using standard multi-tasking techniques, subject to the restriction, that there is no pre-emption of processing of any stimulus.

Figure 11:
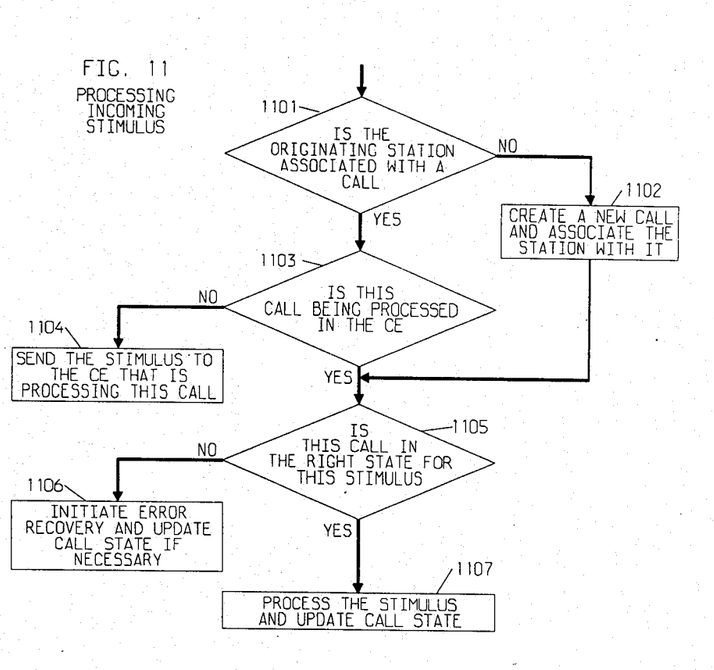
FIGS. 11, 12 and 13 show flow charts of the operation of a multi-module parallel processing system.
Figure 12:
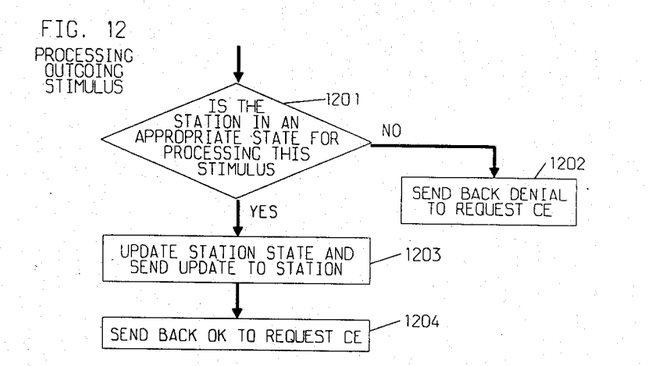
Figure 13:
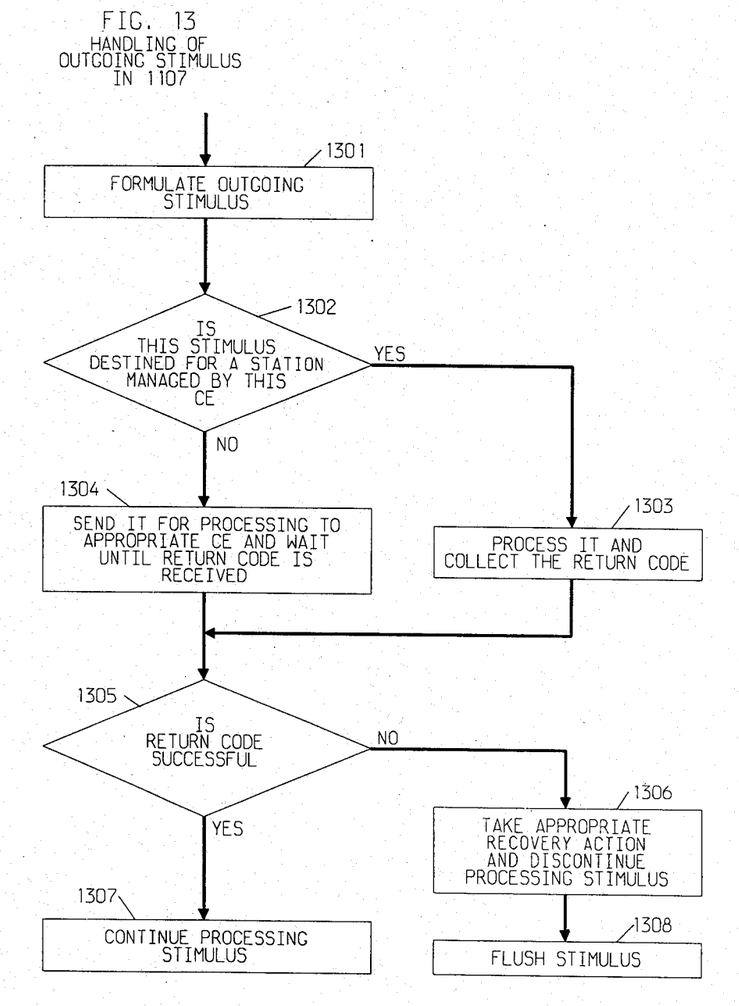

Subject to the restrictions mentioned above, the algorithms that are used to process a normal stimulus, and generation and processing of an outward-stimulus are shown in FIGS. 11, 12 and 13.

FIG. 11 shows the decisions that must be made before starting the actual processing of a normal stimulus. If the stimulus is originated by a station which is not yet associated with any call, a call is created box 1102 to associate the stimulus with. On the other hand, if a call is already associated with the originating station then in Boxes 1101 and 1103 determined if the call is being controlled by this CE or by some other CE. If the call is being controlled by some other CE then the stimulus is forwarded to the appropriate CE box 1104. If the call is being controlled locally, then box 1105 determines whether the call is in an appropriate state to receive the type of stimulus that has been received. If it is, then the stimulus is processed in box 1107. If it is not, then appropriate error recovery action is initiated by box 1106.

In FIG. 12, the processing of an outward-stimulus is illustrated. Outward-stimuli generally pertain to the state of a call and its associated resources. Successful processing of an outward-stimulus hinges on the resources associated with that call being in the proper states. This is determined in box 1201. If the resources are in the appropriate states, then the outward-stimulus is processed and the state of the affected resources are updated appropriately by box 1203 to reflect the new states. If the states of the resources are inappropriate, then a denial is returned to the requester by box 1202. If the outward-stimulus is processed successfully, then a success status is returned to the originator of the outward-stimulus by box 1204.

FIG. 13 shows how an outward-stimulus is handled by box 1107 of FIG. 11. When the need for an outward-stimulus arises in the process of processing a normal stimulus, first the outward-stimulus is formulated by box 1301. Then, by box 1302, the destination of the outward-stimulus is determined. If it is destined for the same CE, then it is immediately processed by box 1303, otherwise it is sent to the appropriate CE for processing by box 1304. The processing of the normal stimulus is suspended pending the arrival of the result of processing the outward-stimulus by the other CE.

In either case, upon the completion of processing, box 1305 determines the status of processing. If it was successful, the stimulus processing continues normally by box 1307. If the return status is not successful, then further processing of the stimulus is suspended and appropriate error recovery is initiated by boxes 1306 and 1307.

CONCLUSION

The multi-processing arrangement I have described is capable of being achieved in any number of different communication systems, such as, for example, the system shown in the aforementioned Baxter et al reference. It is important to understand that the invention is not limited to use in PBX's or conventional telephone systems but also applies to computer and data applications where, stimuli from two or more processors for interaction between the terminals.

It should also be understood that, while only the simple function of the merger of two connections has been discussed, my invention can be utilized to perform complex interactions between processors, all dependent upon the concepts discussed herein.

What is claimed is:

1. A communication system having a plurality of terminals associated therewith, each such terminal operable for establishing communication connections as a result of stimuli generated from said terminals, said communication system including a call processing module, said module comprising
    means for receiving said stimuli from said terminals,
    means for associating each said received stimuli with the terminal sending said received stimuli,
    means for establishing a queue of said received stimuli from said terminals in order of the arrival of said stimuli,
    means for processing from said queue stimuli associated with a particular terminal in order of arrival of said stimuli, and
    means for intermixing the processing of stimuli associated with different terminals so that a set of stimuli from a given terminal need not be processed to completion prior to processing stimuli from another terminal.

2. The invention set forth in claim 1 wherein said communication system further includes
    a plurality of said call processing modules, each such module associated with only certain ones of said terminals and each said module including a unique queue of said received stimuli, said establishing means operable for adding to said unique module queue stimuli received only from said associated terminals,
    said modules including means for establishing for each connection of terminals one of said modules as a control module for said connection, and
    means for adding stimuli to said control module stimuli queue in order of arrival of said stimuli from all terminals associated with said connection without regard to which module each said terminal is associated.

3. The invention set forth in claim 2 wherein each said module further includes means for interconnecting said terminals associated with said module, and wherein said communication system further comprises
    means for controlling data flow between said modules, and
    means, including said last-mentioned means, for transferring queued stimuli between said modules.

4. The invention set forth in claim 3 wherein said transfering means includes means for transfering to said control module stimuli associated with said connection of terminals which stimuli were originally directed to another module.

5. The invention set forth in claim 2 wherein said control module further includes
    means for interpreting received ones of said stimuli for the purpose of completing connections in accordance with said interpreted stimuli,
    means for communicating control messages between said modules,
    means responsive to an interpreted one of said stimuli for enabling one of said messages to a selected other one of said modules for controlling the interconnection of terminals associated with said interpreted stimulus, and
    means responsive to received ones of said messages communicated from said other module for reinterpreting said previously interpreted stimuli.

6. The invention set forth in claim 1 wherein said communication system further comprises
    a plurality of said call processing modules, each such module operable for receiving stimuli only from certain associated ones of said terminals,
    means for establishing for each connection of terminals one of said modules as a control module for that connection, and
    means for transfering stimuli between said modules, said transfering means including,
    means for transfering to said established control module stimuli from terminals associated with another module.

7. The invention set forth in claim 1 wherein said system further includes means for merging a plurality of said connections into a single connection.

8. The invention set forth in claim 7 wherein said merging means includes means for processing to completion the stimuli from said merged connections as a single queue in order of arrival of said stimuli.

9. The invention set forth in claim 8 wherein each said module is arranged to send messages to any other module.

10. The invention set forth in claim 9 wherein said merged connection single queue processing means is controlled in part by said stimuli messages transmitted between said modules.

11. The invention set forth in claim 10 wherein each said module includes means for storage of received ones of said messages in a separate queue, and
    means for processing all messages stored in said separate queue prior to processing unprocessed ones of said stimuli stored in said stimuli queue.

12. The invention set forth in claim 10 wherein said control module further includes
    means for interpreting received ones of said stimuli for the purpose of completing connections in accordance with said interpreted stimuli,
    means responsive to an interpreted one of said stimuli for enabling one of said messages to a selected other one of said modules for controlling the interconnection of terminals associated with said interpreted stimulus, and
    means responsive to received ones of said messages communicated from said other module for reinterpreting said previously interpreted stimuli.

13. The invention set forth in claim 1 wherein said system further includes means for merging a plurality of connections into a single connection.

14. The invention set forth in claim 13 wherein said merging means includes means for processing to completion the stimuli from said merged connections as a single queue in order of arrival of said stimuli.

15. The invention set forth in claim 2 wherein each said module further includes
    means for establishing a second queue having a separate priority from said stimuli queue.

16. The invention set forth in claim 15 wherein each said module is arranged to send control messages to any other module for storage in said second queue of said other module.

17. The invention set forth in claim 6 wherein said system further comprises
means for establishing a second queue having a separate priority from said stimuli queue.

18. The invention set forth in claim 17 wherein each said module is arranged to send messages to said second queue of selected other module.

19. The invention set forth in claim 2 wherein each said module is a separate PBX for controlling communication connections between terminals served by said module independent of the existence of connections to any other module.

20. A communication system having a plurality of terminals connected thereto, each such terminal operable for establishing or receiving communication connections as a result of stimuli generated from said terminals, said communications system comprising
a plurality of independent processors, each said processor operable for receiving said stimuli from only certain ones of said terminals and for controlling communication connections to and from said certain terminals in accordance with received ones of said stimuli,
means for establishing for each communication connection between a group of terminals one of said processors as a control processor for that connection,
transfering means for establishing within said established control processor a queue of stimuli in order of arrival of said stimuli from all terminals associated with said communication connection without regard to which processor first received said stimuli.

21. The invention set forth in claim 20 wherein said transfering means includes a central switch for controlling data flow between said processors, said central switch operable for transferring stimuli between said modules.

22. The invention set forth in claim 21 wherein said system further comprises means for establishing a new single connection of terminals from a plurality of previously established terminal connections, said last-mentioned means including means for establishing the processor associated with a controlling one of said terminals of said new connection as the new connection control processor, and
means for transfering all stimuli associated with all said previously established connections to said new connection controlling processor.

23. The invention set forth in claim 22 wherein said transfer means includes means for sending messages to said other processors for storage in said other processors, and
means in each said processor for processing received ones of said messages on a priority basis.

24. The invention set forth in claim 20 wherein said processors each further includes means for processing stimuli associated with each connection in the order of arrival of said stimuli, and
means for processing stimuli from different connections without regard to the order of arrival of the respective stimuli of said different connections.

25. The invention set forth in claim 24 wherein said processors generate outward-stimuli for communication between said processors, and wherein said transfer means is operable in response to processing of received ones of said outward-stimuli.

26. The invention set forth in claim 25 wherein each said processor includes a second queue separate from said first queue for queing received ones of said outward-stimuli,
means for processing to completion all stimuli stored in said second queue prior to processing stimuli in said stimuli queue, and
means for inhibiting said last-mentioned means until the completion of processing of any stimuli from said stimuli queue.

27. The invention set forth in claim 25 wherein each said control processor further includes
means for interpreting received ones of said stimuli for the purpose of completing connections in accordance with said interpreted stimuli,
means responsive to an interpreted one of said stimuli for enabling one of said outward-stimuli to a selected other one of said modules for controlling the interconnection of terminals associated with said interpreted stimulus, and
means responsive to received ones of said outward-stimuli communicated from said other module for reinterpreting said previously interpreted stimuli.

28. A processor for controlling connections between terminals associated with said processor, said processor including a switch and a control element, said processor including
means for establishing a queue of connection control stimuli from terminals associated therewith,
means for processing stimuli from a particular connection in the queued order of said stimuli,
means for processing other stimuli from other connections in the queued order of said other stimuli,
means for time intermixing the processing of said particular connection stimuli with stimuli from said other connections,
means for interpreting received ones of said stimuli for the purpose of completing connections in accordance with said interpreted stimuli,
means responsive to an interpreted one of said stimuli for enabling a control stimulus to be sent to another processor for controlling the interconnection of terminals associated with said interpreted stimulus, and
means responsive to received ones of said control stimuli communicated from another said processor for reinterpreting said previously interpreted stimuli.

29. The invention set forth in claim 26 wherein said processor includes
means for connecting said processor to a second processor so that connections can be established between terminals connected to either of said processors, and
means for transfering stimuli between said processors.

30. The invention set forth in claim 29 further comprising,
means for controlling said transfer dependent upon which processor has control of a connection so that stimuli coming from all terminals associated with a particular connection are stored in a queue within the processor controlling said particular connection without regard to the terminal generating said stimuli.

31. The invention set forth in claim 30 wherein said processor includes means for receiving inter-processor messages, and wherein said transfering means is controlled in part by received ones of said messages.

32. The invention set forth in claim 31 wherein said processor includes means for storing received ones of said messages and means for processing all said stored messages prior to processing said connection control stimuli.

33. The invention set forth in claim 31 wherein said processor further includes
means for interpreting received ones of said stimuli for the purpose of completing connections in accordance with said interpreted stimuli,
means responsive to an interpreted one of said stimuli for enabling one of said interprocessor messages to a selected other one of said processors for controlling the interconnection of terminals associated with said interpreted stimulus, and
means responsive to received ones of said interprocessor messages communicated from said other processor for reinterpreting said previously interpreted stimuli.

34. The method of operating a communication system having a plurality of terminals associated therewith, each such terminal operable for establishing or receiving communications connections as a result of stimuli generated from said terminals, said method comprising the steps of
receiving said stimuli from said terminals,
associating each said received stimuli with the terminal sending said received stimuli,
establishing a queue of said received stimuli from said terminals in order of the arrival of said stimuli,
processing from said queue stimuli associated with a particular terminal in order of arrival of said stimuli,
intermixing the processing of stimuli associated with different terminals,
said communication system further comprises a plurality of call processing modules, each such module operable for receiving stimuli only from certain associated ones of said terminals, said method further comprising the steps of
establishing for each connection one of said modules as a control module for that connection, and
establishing within said control module a queue of stimuli in the order of arrival of said stimuli from all terminals associated with said connection without regard to which module each said terminal is associated.

35. The method of controlling connections between terminals associated with a processor, said processor including a switch and a control element, said method including the steps of
establishing a queue of connection control stimuli from terminals associated with said processor,
processing stimuli from a particular connection in the queued order of said stimuli,
processing other stimuli from other connections in the queued order of said other stimuli,
intermixing the processing of said particular connection stimuli with stimuli from said other connections,
said processor is connected to a second processor so that connections can be established between terminals connected to either of said processors, and wherein said method further includes the steps of
establishing one of said processors as a controlling processor when terminals associated with more than one processor become interconnected, and
transfering stimuli between said processors so that a controlling one of said processors for any one connection queues all stimuli pertaining to that one connection without regard to the station from which the stimuli was generated.

36. The invention set forth in claim 35 wherein said method further includes the steps of
interpreting received ones of said stimuli for the purpose of completing connections in accordance with said interpreted stimuli,
enabling, in response to an interpreted one of said stimuli, a control stimulus to be sent to another processor for controlling the interconnection of terminals associated with said interpreted stimulus, and
reinterpreting said previously interpreted stimulus in response to received ones of said control stimuli communicated from another said processor.

37. A multi-processor communication system serving a plurality of terminals, said terminals distributively connected to said processors and operable for establishing and terminating communication connections there between in response to control stimuli passing between each said terminal and the processor connected thereto, each said processor performing the steps of
receiving and storing said stimuli from said connected terminals,
establishing, for the duration of a particular interconnection of terminals, a controlling processor for that particular interconnection, and
transfering to said controlling processor for said duration received and stored stimuli from said interconnected terminals, and
processing said stimuli that are associated with a connection for which the said processor is the controlling processor in the order of arrival of said stimuli for a given connection associated with the stimulus, but not necessarily in the order of arrival of stimuli generating a number of control messages for controlling the connection state of said associated terminals.

38. The invention set forth in claim 37 further comprising the steps of
changing the connection state of a terminal associated with another connected processor by sending to said other processor control messages,
storing said control messages separate from said received stimuli, and
processing all said stored control messages prior to processing unprocessed ones of said stored stimuli.

* * * * *

UNITED STATES PATENT AND TRADEMARK OFFICE
CERTIFICATE OF CORRECTION

PATENT NO.   : 4,654,845

DATED        : March 31, 1987

INVENTOR(S)  : Mukerji, Jishnu

It is certified that error appears in the above-identified patent and that said Letters Patent is hereby corrected as shown below:

In the abstract, line 8, "station" should read --stations--.

In the abstract, line 9, "the connec-" should read --the same connec---. Column 12, line 53 "26" should read --28--.

Signed and Sealed this

Twenty-seventh Day of October, 1987

Attest:

DONALD J. QUIGG

*Attesting Officer*   *Commissioner of Patents and Trademarks*